Jan. 30, 1945.     G. A. LYON     2,368,247
WHEEL STRUCTURE
Filed June 21, 1943     2 Sheets-Sheet 1
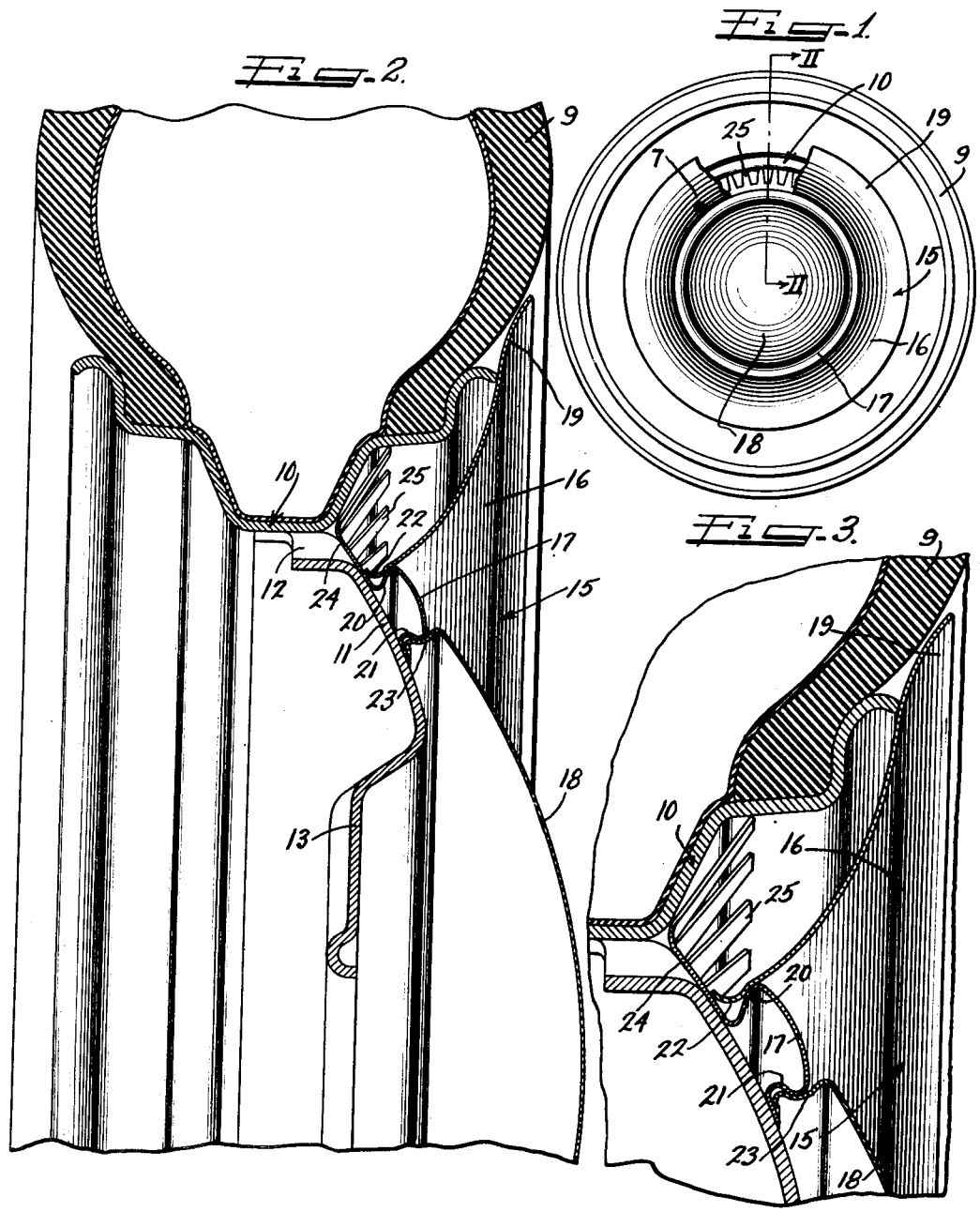
Inventor
GEORGE ALBERT LYON.
by Charles W Hills
Atty.

Jan. 30, 1945. G. A. LYON 2,368,247
WHEEL STRUCTURE
Filed June 21, 1943 2 Sheets-Sheet 2
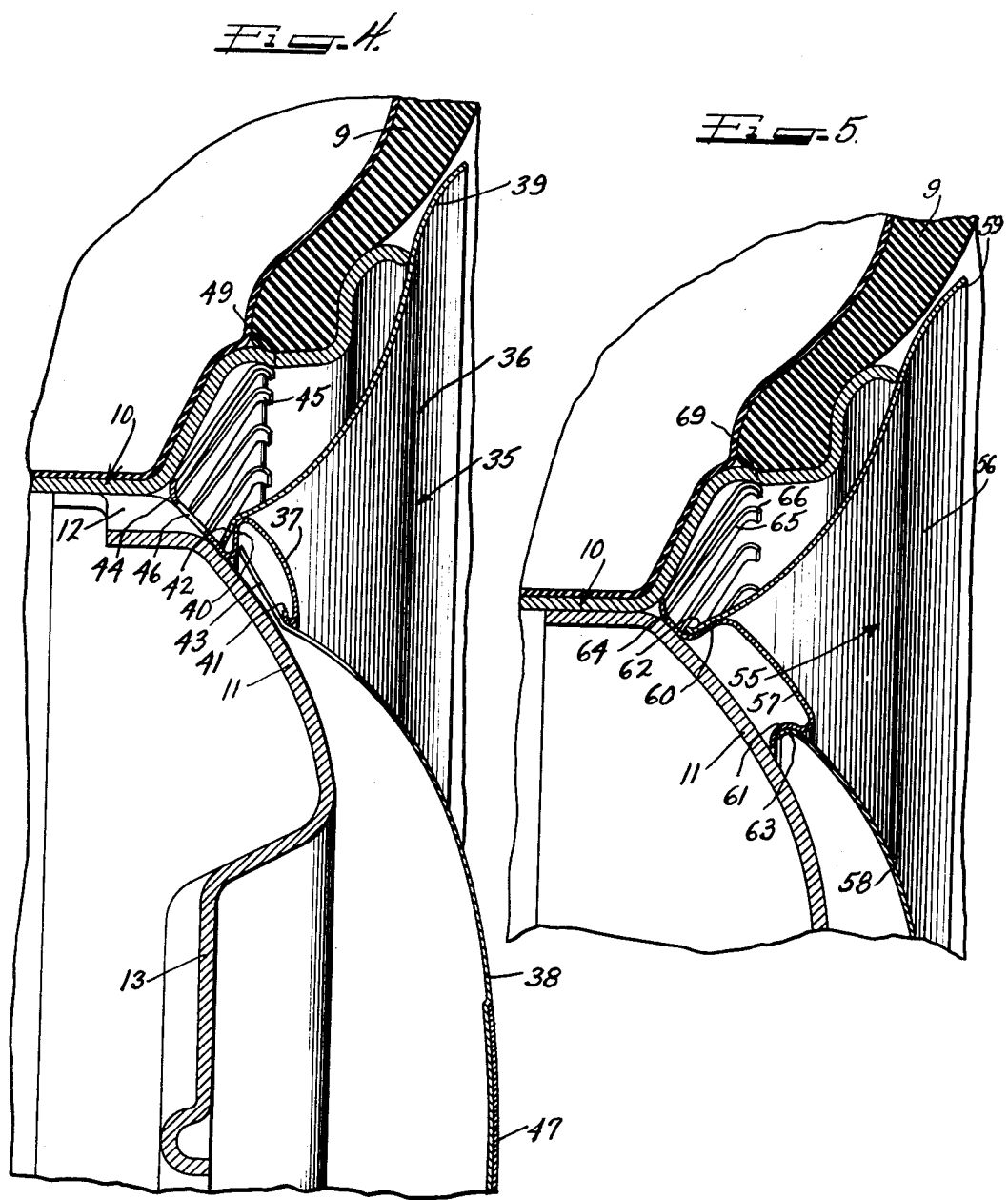
Inventor
GEORGE ALBERT LYON.
by Charles W. Hill, Attys.

Patented Jan. 30, 1945

2,368,247

UNITED STATES PATENT OFFICE 2,368,247

WHEEL STRUCTURE

George Albert Lyon, Allenhurst, N. J.

Application June 21, 1943, Serial No. 491,605

10 Claims. (Cl. 301—37)

This invention relates to a wheel structure and more particularly to novel retaining means on a wheel for holding a plurality of cover parts on the wheel.

An object of this invention is to provide a simplified form of retaining means adapted to retain a plurality of cooperable concentric cover parts on an automobile wheel.

Another object of this invention is to provide a multi-part cover wherein the retaining means not only cooperates in its function of holding the cover parts on the wheel but, in addition, is so interrelated to the cover parts that it rigidifies the same and also contributes to the ornamental effect flowing from the arrangement of the parts.

A still further object of this invention is to provide a wheel cover embracing a multiplicity of parts all of which lend themselves to economical manufacture on a large production basis.

In accordance with the general features of this invention, there is provided in a wheel structure including a multi-flanged rim adapted to carry a tire, and a wheel body, a wheel cover assembly therefor comprising a metallic ring having inclined radially outwardly extending fingers formed to be pressed axially into resilient gripping engagement with a rim flange and also having an annular bead with under turned shoulders at its inner and outer edges, a trim ring part for the rim having an inner edge snapped over and behind the outer shoulder of the bead into retaining engagement therewith and a hub cap part having a peripheral portion snapped over the inner shoulder of the bead and into detachable engagement therewith.

A still further feature of the invention relates to the formation of the retaining means of the above described wheel structure so that such retaining means may, as desired, leave open the ventilation openings in the wheel body or close them, in accordance with the particular acquirements of the wheel and brake drum assembly.

Another feature of the invention relates to the provision in the aforedescribed structure of an arrangement whereby the hub cap may be removed or applied as desired without necessitating removal of the other parts of the wheel cover assembly.

A still further feature of the invention relates to the construction of the parts and means going to make up the aforementioned wheel cover assembly so that the trim ring and hub cap parts may, if desired, be made of a plastic material which possesses the physical properties of being self-sustaining with regard to shape and yet being resiliently flexible without permanent deformation.

Other objects and features of this invention will more fully appear from the following detail description taken in connection with the accompanying drawings which illustrate several embodiments thereof and in which:

Figure 1 is a side elevation of a wheel structure embodying the features of this invention and in which the wheel cover is partly broken away to show the spring retaining fingers for holding the cover on the wheel;

Figure 2 is an enlarged fragmentary cross-sectional view taken on the line 2—2 of Figure 1, looking in a direction indicated by the arrows;

Figure 3 is an enlarged fragmentary cross-sectional view corresponding to the upper right-hand portion of Figure 2 showing more clearly the manner in which the resilient retaining fingers hold the two cooperating cover parts on the wheel;

Figure 4 is a cross-sectional view similar to Figure 2 illustrating a modification of the invention; and Figure 5 is a further cross-sectional view similar to Figure 4 illustrating a still further modification of the invention as shown in the drawings.

The reference character 9 indicates generally a conventional type of tire including the usual inner tube mounted upon a multi-flanged drop center type of tire rim 10. The valve stem of the inner tube is shown in Fig. 1 at 7, projecting through a hole in the trim ring 16, but it is understood that it may be concealed by the cover of my invention, inasmuch as the outer ring of my cover is flexible for the purpose of affording access to the valve stem.

The conventional drop center type tire rim 10 is attached in the usual way at a plurality of circumferentially spaced areas to a wheel body or spider 11, there being spaced openings 12 between the areas of attachment of the spider through the base flange of the rim 10.

The body part 11 is provided at its center with a depressed section formed into a bolt-on flange 13 by means of which the wheel may be bolted in a conventional manner to a support on the wheel or the like. Inasmuch as the wheel is conventional and is shown in the different modifications, I have used the same reference numerals in the different modifications to identify the identical parts of the wheel hereinabove described.

Associated with the aforesaid wheel, as best shown in Figure 2, is a wheel cover assembly designated generally by the reference character 15 and which embodies in the particular illustration, three parts namely an outer annular trim ring 16, and intermediate metallic retaining ring 17 and a central hub cap part 18.

The annular trim ring 16 can be made of any suitable sheet material but I have obtained excellent results by making it of a thermo-plastic material such, for example, as ethyl cellulose. The primary requisite of this ring is that it be self-sustaining with respect to its shape or form and that it have the requisite resiliency to enable its flexibility and still provide for its return to its initial position after each flexing thereof. It should also be sufficiently resilient to resist deformation upon indenture or upon it being struck a hard blow in usage. By making it flexible, it is possible to manually manipulate its outer lips 19 for the purpose of flexing the ring away from the flanges of the rim to afford access to the rear side thereof and to the valve stem not shown. In addition by flexing it outwardly, it is possible to insert therebehind a pry-off tool when it is desired to apply a force to the retaining means holding the same on the wheel for the purpose of ejecting the cover from the wheel.

The intermediate retaining ring 17 may be made of a more rigid material such, for example, as metal and has an under turned or undercut edge portion 20 at its outer periphery and an under turned or undercut edge 21 at its inner periphery. Thus there is provided a hollow bead-like ring defined at its inner and outer peripheral portions by undercut or shouldered edges.

The inner peripheral edge of the trim ring 16 is turned rearwardly slightly as indicated at 22 and is adapted to be flexed into or out of retaining engagement with the under-turned or undercut shoulder 20 of the ring 17. Thus the trim ring 16 is resiliently securable to the intermediate, more rigid ring 17.

Similarly the hub cap 18, which may be made of any suitable sheet material, may be made of a suitable plastic material if so desired, but I preferably make it of sheet metal so that the end of a screw-driver or other pry-off tool may be inserted under its outer edge to pry it free from the ring 17. It has a rearwardly turned annular skirt 23, which is resiliently flexible over the high point of the undercut portion or shoulder 21 of the ring 17 whereby the hub cap 18 may be detachably secured to the intermediate ring 17. By reason of the fact that the skirt 23 of the hub cap extends axially beyond the ring 17, it is possible to insert a pry-off tool under the peripheral edge of the hub cap when it is desired to eject forcibly the hub cap from its retaining cooperation with ring 17.

In addition, the underturned outer edge portion 20 of the metallic intermediate ring 17, which may be formed of stainless steel or any other suitable material lending itself to a lustrous finish, has formed integral with it a generally radially extending flange 24 which projects beyond the wheel openings 12. This flange 24 has formed integrally therewith radially outwardly projecting resilient fingers 25 by means of which the ring 17 may be resiliently secured to one of the flanges of the tire rim. It should be noted that the fingers 25 are inclined at such an angle that upon the ring 17 being pressed axially into cooperation with the wheel such fingers will easily assume their retaining position but, by reason of the angle of each of them, they are more difficult to remove from the engaged position. The angle of the fingers is such that any tendency to dislodge them accidentally will result in the enhancement of their grip. The concept of having fingers at such an angle that they are easy to move into retained position but more difficult to remove, has been fully disclosed in previous patents granted to me such as U. S. Letters Patent Reissue 19,446, issued February 12, 1935.

The location of the flange 24 carrying these fingers 25 is such that said flange will overlap the wheel openings and will, in the particular embodiment illustrated, serve to prevent the entry of dust and other foreign matter in the space between the trim ring 16 and the tire rim.

The aforesaid cover is very easy to apply to the wheel. First the ring 17 is pressed axially into its retained cooperation with the wheel and thereafter the plastic trim ring 16 is pressed axially over the shoulder 20 of the bead 17 into retained engagement with the same. Similarly the hub cap may be applied by pressing it axially into retaining snap-on engagement with the shoulder 21 of the rigid metallic bead 17. The hub cap is, of course, removable by the application of a pry-off tool to its outer projecting edge whereby it may be forcibly ejected from its cooperation with the ring 17. On the other hand, it is not necessary to remove the trim ring 16 when it is desired to have access to the valve stem, if concealed, since the trim ring may be manually flexed relative to its support on the bead 17. By flexing the lip portion 19 outwardly away from the wheel assembly, it is possible to have access to the space behind the ring, affording access to the valve stem.

The entire assembly may, of course, be removed when it is desired, by applying sufficient pry-off force to the rear of the trim ring at the shoulder 20 by means of the end of a pry-off tool such as a screw driver. In order to remove the asembly, of course, it is to be understood that the fingers 25 should not have such biting engagement with the tire rim as to preclude removal (see Fig. 4). In the event that such fingers do have such a biting engagement, then the trim ring may be manually flexed off of the bead 20 and the fingers may thereafter be suitably manipulated for the purpose of removing the ring 17 from the wheel.

In Figure 4 I have illustrated a modification of the invention wherein the cover is designated generally by the reference character 35 and embodies three parts, 36, 37 and 38, which correspond substantiallly with the parts 16, 17 and 18 of the first described form of the invention. It should be noted that in this form the hub cap part 38 is provided with a central indicia 41 such as the name of the car. This indicia may be applied in any suitable manner and may, if it is so desired, be formed as a part of the central hub cap 38.

This form has a trim ring 36 which, like the trim ring 16, has a flexible outer lip 39 corresponding with the lip 19 of the first described form. By making the trim ring 36 of a plastic material it is possible to manipulate it in the same manner as the trim ring 16.

The intermediate metallic ring 37 has an under turned or undercut outer peripheral shoulder 40 cooperable with the radially inner turned edge 42 of the trim ring 36. This trim ring is adapted to be snapped over the shoulder 40 in the same manner as the previously described trim ring. Similarly the hub cap 38 has an inclined rear marginal portion 43 which is adapted to be snapped over the trim ring from the rear side thereof into retaining engagement with the undercut or under turned shoulder 41 of the metal ring 37.

The metal ring 37 has its under turned edge portion 40 formed into an inclined flange portion 44 which has integrally formed with it a plurality of resilient retaining fingers 45 each of which has a turned outer extremity so as to facilitate a snap-on and off engagement of the fingers with the tire rim.

If it is so desired, the tire rim may be provided with a slight hump or shoulder 49 over which the turned ends of the fingers 45 may be snapped into resilient retaining engagement with the rear side of the hump or shoulder 49.

In addition the flange 44 may, if it is so desired, be provided with an opening 46 registering with the wheel body openings 12 so as to permit the circulation of air therethrough. This may be necessary under some conditions where the brake drum that is used with the wheel requires a large amount of air circulation in order to keep it cool.

The operation of this form of the invention is substantially the same as the previously described one and the parts thereof are made of substantially the same materials and have substantially the same physical characteristics as the parts of the previous embodiment.

In Figure 5 I have illustrated a further embodiment of the invention having a slightly different form of metal retaining ring but which, in general, operates substantially the same as the previously described forms and is made of substantially the same material.

In this form of the invention the cover is designated generally by the reference character 15 and embodies an outer plastic trim ring 56, an intermediate metallic ring or bead 57 and a central plastic hub cap 58.

The outer trim ring 56 which is annular in configuration has a flexible outer lip 59 which, as in the case of the previously described form of the invention is slightly spaced from the tire so as not to contact the same. Moreover, the flexibility of this lip permits of its movement even though the tire is collapsed due to a puncture or the like.

The intermediate metal retaining ring or bead 57 which may be made of stainless metal or the like having a lustrous external finish, has outer and inner turned shoulders 60 and 61. The trim ring 56 has an inner edge 62 resiliently snapped over and into retaining engagement with the shoulder 60. Similarly the hub cap 58 has a rearwardly turned resilient skirt 63 which is snapped over and into retaining detachable engagement with the shoulder 61 of the bead 57. In this embodiment however the hub cap 58 may be applied to the ring 57 from the rear side thereof prior to the application of the ring to the tire. In other words, this form, as in the Fig. 4 form, contemplates that the entire assembly may be removed as a unit by the prying of the same out of engagement with the wheel rather than the separate removal of the hub cap 58.

The outer shoulder 60 of the ring 57 has formed integral with it a curled flange 61 which overlaps the junction of the rim and body parts 10 an 11 of the wheel. This flange 61 has formed with it a plurality of integral fingers 65 each of which has a turned edge 66 adapted to be resiliently pressed over and behind a hump or shoulder 69 formed in one of the rim flanges.

The application and operation of this form of cover is the same as the previously described one and hence no further description of the same is thought to be necessary.

It should, however, be understood that in all forms of the invention the cover may be constructed to be removed by flexing the outer trim ring 56 away from the wheel so as to permit the introduction of a pry-off tool between the trim ring and the rim for the purpose of engaging the inner edge of the trim ring behind the outer shoulder of the intermediate metal ring. This outer shoulder of the intermediate metal ring serves as a backing to resist the pressure of the pry-off tool in the manipulation of the same for the purpose of forcibly ejecting the cover from its resiliently engaged contact with the wheel.

Attention is also directed to the fact that by reason of the light material of which the principal cover parts may be made, the present wheel cover of my invention will materially lessen the unsprung weight of an automobile wheel. For illustration, a conventional wheel hub cap made of metal, together with the usual wheel trim, may weigh in the neighborhood of thirty-six or more ounces. A cover made in the form of the present invention, in which the trim ring and hub cap parts are made of plastic, may be made of substantially two-thirds less weight, or in other words, in the neighborhood of twelve ounces in weight. In such a structure the plastic sheet material used for the trim ring and hub cap may be made of sheet of twenty-five to thirty thousandths in thickness. Such plastic parts are capable of as much as two inches deflection without becoming distorted. For example, if one of the parts is struck a blow, it can be depressed to the extent of two inches and still be capable of returning to its original contour, by reason of its inherent resilient properties.

The trim ring and central cover parts may be optionally used together, with the intermediate metal ring, or either one may be used, as desired, since they are each independently retained on the intermediate ring. It is preferable, however, to use some form of outer trim ring in order to conceal the retaining fingers of the metal ring.

In all forms of my invention the trim ring is of such cross-sectional shape and radial depth as to appear to be a continuation of the side wall of the tire. This is particularly true when such ring is given a light or white external finish which will cause the tire to have the appearance of having a white side wall.

What I claim is:

1. In a wheel structure including a multiflanged rim adapted to carry a tire and a wheel body, a wheel cover assembly therefor comprising a metallic ring having inclined radially outwardly extending fingers formed to be pressed axially into resilient gripping engagement with a rim flange and also having an annular bead with undercut shoulders at its inner and outer edges, a plastic trim ring part for the tire rim having an annular edge snapped over and behind said outer shoulder of said bead into retaining engagement therewith and a hub cap part having a peripheral portion snapped over said inner shoulder into detachable engagement with said bead.

2. In a wheel structure including a multiflanged rim adapted to carry a tire and a wheel body, a wheel cover assembly therefor comprising a metallic ring having inclined radially outwardly extending fingers formed to be pressed axially into resilient gripping engagement with a rim flange and also having an annular bead with undercut shoulders at its inner and outer edges, a plastic trim ring part for the tire rim having an annular edge snapped over and behind said outer shoulder of said bead into retaining engagement therewith and a hub cap part having a peripheral portion snapped over said inner shoulder into detachable engagement with said bead, said bead being disposed between said trim ring and hub cap part and extending outwardly therebetween so as to be visible and one of said parts being made of plastic material having the physical property of being self-sustaining insofar as its shape is concerned and also resiliently resistant to deformation, said bead reinforcing said part at its point of attachment to the wheel.

3. In a wheel structure including a multi-flanged rim adapted to carry a tire and a wheel body, a wheel cover assembly therefor comprising a metallic ring having inclined radially outwardly extending fingers formed to be pressed axially into resilient gripping engagement with a rim flange and also having an annular bead with undercut shoulders at its inner and outer edges, a plastic trim ring part for the tire rim having an annular edge snapped over and behind said outer shoulder of said bead into retaining engagement therewith and a hub cap part heaving a peripheral portion snapped over said inner shoulder into detachable engagement with said bead, said trim ring and hub cap parts being made of a plastic material having the physical properties of being self-sustaining as to shape and yet resiliently resistant to permanent deformation, both of said parts being detachable from said bead without requiring detachment of said metallic ring from the wheel.

4. In a wheel structure including a multi-flanged rim adapted to carry a tire and a wheel body, a wheel cover assembly therefor comprising a metallic ring having inclined radially outwardly extending fingers formed to be pressed axially into resilient gripping engagement with a rim flange and also having an annular bead with under turned shoulders at its inner and outer edges, a plastic trim ring part for the tire rim having an annular edge snapped over and behind said outer shoulder of said bead into retaining engagement therewith and a hub cap part having a peripheral portion snapped over said inner shoulder into detachable engagement with said bead, said hub cap part having its outer edge applied over the inner shoulder of said bead prior to the application of said metallic ring to the wheel body by said bead, said trim ring having its inner edge applied over the outer shoulder of said bead from the outer side of said bead.

5. In a wheel structure including a multi-flanged rim adapted to carry a tire and a wheel body, a wheel cover assembly therefor comprising a metallic ring having inclined radially outwardly extending fingers formed to be pressed axially into resilient gripping engagement with a rim flange and also having an annular bead with under turned shoulders at its inner and outer edges, a plastic trim ring part for the tire rim having an annular edge snapped over and behind said outer shoulder of said bead into retaining engagement therewith and a hub cap part having a peripheral portion snapped over said inner shoulder into detachable engagement with said bead, said hub cap part having its outer edge applied over the inner shoulder of said bead prior to the application of said metallic ring to the wheel, so as to be clamped to the wheel body by said bead, said trim ring having its inner edge applied over the outer shoulder of said bead from the outer side of said bead, the outer edges of said fingers being slightly turned whereby the entire assembly may be removed from the tire by the 'exing of the outer trim ring to permit the introduction of a pry-off tool therebehind for the purpose of bearing against the inner edge of said trim ring and the outer shoulder of said metallic bead in the application of a pry-off force to the cover assembly.

6. As an article of manufacture, a wheel cover for a wheel including a multi-flanged rim adapted to carry a tire and a wheel body, said cover comprising three parts including a plastic trim ring for covering the exposed surfaces of the flanges of said rim, a central hub cap for disposition over the central part of the wheel body and an exposed intermediate metal ring for holding said parts together on the wheel, said intermediate ring being provided with generally radially extending resilient fingers positioned behind the trim ring for resilient gripping engagement of one of the tire rim flanges to hold the cover on the wheel.

7. In a wheel structure including a multi-flanged rim adapted to carry a tire and a wheel body, a wheel cover assembly therefor comprising a metallic ring having inclined radially outwardly extending fingers formed to be pressed axially into resilient gripping engagement with a rim flange and also having an annular bead with undercut shoulders at its inner and outer edges, a plastic trim ring part for the tire rim having an annular edge snapped over and behind said outer shoulder of said bead into retaining engagement therewith and a hub cap part having a peripheral portion snapped over said inner shoulder into detachable engagement with said bead, said rim and wheel body being connected at spaced intervals leaving openings in the wheel body therebetween and said metallic ring having a flanged portion to which said fingers are connected and which flanged portion extends outwardly behind the trim part and covering said wheel openings so as to prevent the passage of dirt into the space between the cover on the wheel rim.

8. In a wheel structure including a multi-flanged rim adapted to carry a tire and a wheel body, a wheel cover assembly therefor comprising a metallic ring having inclined radially outwardly extending fingers formed to be pressed axially into resilient gripping engagement with a rim flange and also having an annular bead with undercut shoulders at its inner and outer edges, a plastic trim ring part for the tire rim having an annular edge snapped over and behind said outer shoulder of said bead into retaining engagement therewith and a hub cap part having a peripheral portion snapped over said inner shoulder into detachable engagement with said bead, said rim and wheel body being connected at spaced intervals leaving openings in the wheel body therebetween, said metallic ring having a flange extending over the wheel openings into engagement with the wheel rim and which flange is apertured so as to permit air to circulate through the wheel openings behind the wheel cover.

9. In a wheel structure including a multiflanged rim adapted to carry a tire and a wheel body, a wheel cover assembly therefor comprising a metallic ring having inclined radially outwardly extending fingers formed to be pressed axially into resilient gripping engagement with a rim flange and also having an annular bead with under turned shoulders at its inner and outer edges, a plastic trim ring part for the tire rim having an annular edge snapped over and behind said outer shoulder of said bead into retaining engagement therewith and a hub cap part having a peripheral portion snapped over said inner shoulder into detachable engagement with said bead, said hub cap part having its peripheral portion formed into a rearwardly extending skirt for detachable snap-on and off engagement with the inner shoulder of said bead whereby said hub cap may be removed from the wheel without necessitating removal of said trim ring part or of said metallic ring from the wheel.

10. As an article of manufacture, a cover assembly for disposition over the outer side of a wheel structure including a multi-flanged tire rim and a central load bearing portion, said cover assembly including a metallic ring having wheel engaging means arranged to resiliently grip a flange of the tire rim and also having an annular bead with undercut shoulders at its inner and outer edges, a plastic trim ring part for the tire rim having an annular edge snapped over and behind said outer shoulder of the bead into retaining engagement therewith and a hub cap part having a peripheral portion snapped over said inner shoulder into detachable engagement with said bead.

GEORGE ALBERT LYON.